(12) United States Patent
Larsen et al.

(10) Patent No.: US 11,645,902 B2
(45) Date of Patent: May 9, 2023

(54) HEADPHONE LOSS PREVENTION ALARM

(71) Applicant: Sony Group Corporation, Tokyo (JP)

(72) Inventors: Tonni Sandager Larsen, San Diego, CA (US); Ted Yamazaki, San Diego, CA (US)

(73) Assignee: SONY GROUP CORPORATION, Tokyo (JP)

( * ) Notice: Subject to any disclaimer, the term of this patent is extended or adjusted under 35 U.S.C. 154(b) by 248 days.

(21) Appl. No.: 17/203,219

(22) Filed: Mar. 16, 2021

(65) Prior Publication Data
US 2022/0301408 A1 Sep. 22, 2022

(51) Int. Cl.
*G08B 21/24* (2006.01)
*H04R 1/10* (2006.01)
*H04W 4/80* (2018.01)
*H04W 4/12* (2009.01)
*H04B 17/10* (2015.01)

(52) U.S. Cl.
CPC .......... *G08B 21/24* (2013.01); *H04B 17/101* (2015.01); *H04R 1/1091* (2013.01); *H04W 4/12* (2013.01); *H04W 4/80* (2018.02); *H04R 2420/07* (2013.01)

(58) Field of Classification Search
CPC ....... G08B 21/24; H04B 17/101; H04W 4/80; H04W 4/12; H04R 2420/07; H04R 1/1091
See application file for complete search history.

(56) References Cited

U.S. PATENT DOCUMENTS

| | | | |
|---|---|---|---|
| 7,973,657 B2 | 7/2011 | Ayed | |
| 10,026,280 B2 * | 7/2018 | Qin | G08B 29/185 |
| 2010/0283600 A1 * | 11/2010 | Herbert | G08B 21/0252 |
| | | | 340/539.1 |
| 2013/0295853 A1 | 11/2013 | Keddem | |

FOREIGN PATENT DOCUMENTS

| | | |
|---|---|---|
| CN | 108683998 | 10/2018 |
| KR | 20150059612 A * | 6/2015 |
| KR | 101855326 B1 * | 5/2018 |

* cited by examiner

*Primary Examiner* — David L Ton
(74) *Attorney, Agent, or Firm* — Trellis IP Law Group, PC

(57) ABSTRACT

A method of preventing loss of headphones configured to communicate with a cell phone enables an alarm setting using an app on the cell phone; the app responding by continuously measuring a received magnitude of a wireless signal transmitted between the cell phone and the headphones. If the measured received magnitude is lower than a predetermined threshold value for a first predetermined time, an audible alarm is activated at the headphones. The continuous measurement and the activation of the alarm dependent on the measured received magnitude occur automatically, independent of any user interaction with the app after the alarm setting enablement.

Another method addresses a corresponding issue in a similar way to prevent loss of one earbud of a pair.

20 Claims, 4 Drawing Sheets

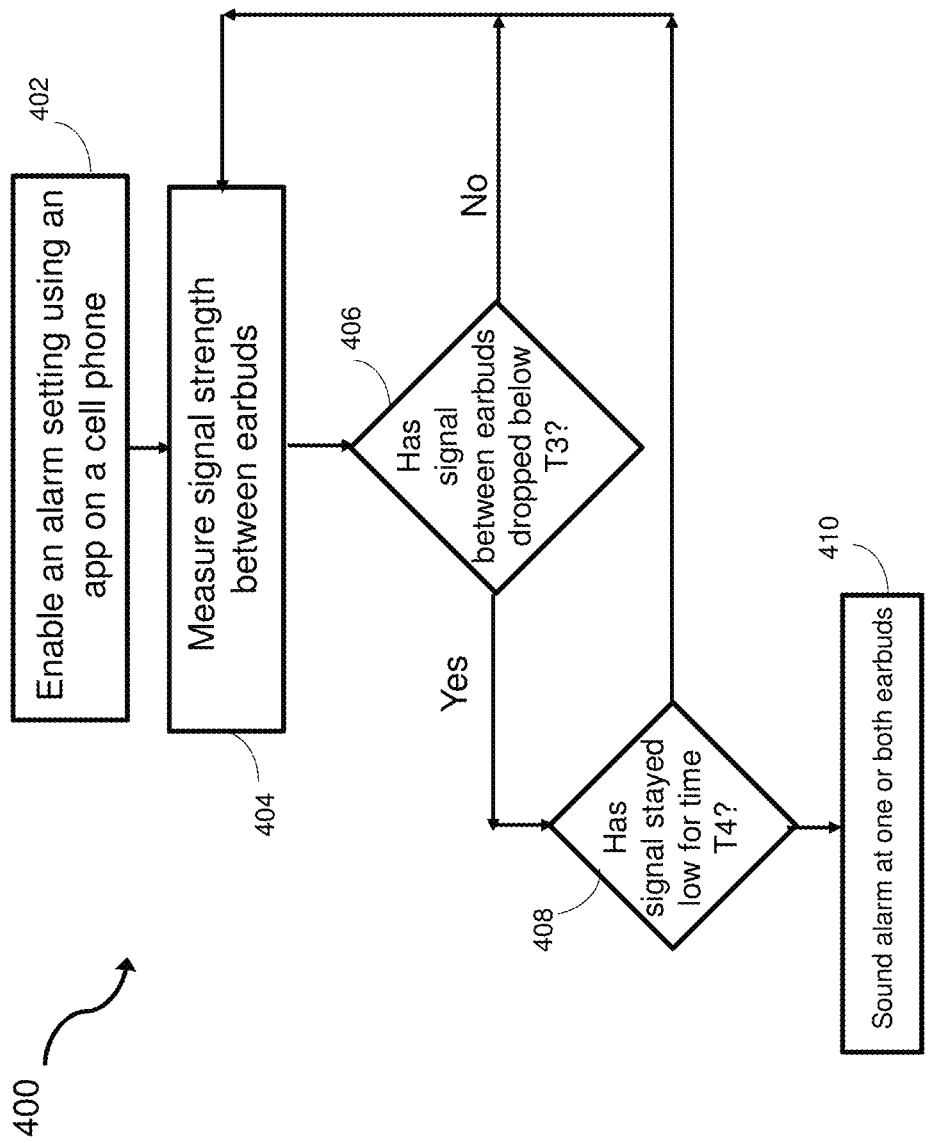

HEADPHONE LOSS PREVENTION ALARM

BACKGROUND

Keeping track of headphones, intended for use while wirelessly connected to a user's cell phone, can be difficult. A typical user generally carries their cell phone with them for large parts of the day, for periods extending through weeks and months, as the user moves from one place to another. As the user may only use the headphones intermittently, the headphones may sometimes be operationally connected to the headphones and sometimes not, and the likelihood of misplacing them is quite appreciable.

Consider cases where the two earpieces of the headphones are used while physically connected together, either by a relatively rigid, usually adjustable band of some type, intended to fit around the head, or just by wires. It can be time consuming and frustrating to realize that the headphones, which were previously paired with a corresponding cell phone and connected to allow user-desired audio communication to occur between the cell phone and the headphones, must have been left behind somewhere during the user's travels. The user must either retrace their steps in person, request help from other people in one or more previously visited locations, or decide to manage without the headphones for some significant period of time, possibly replacing the headphones at a significant cost in time and money.

The same problems just discussed apply to cases where the headphones are made up of a pair of earbuds, with no material connection between the pair when in use. An additional problem also arises, however, if one earbud of the pair is inadvertently left behind in one place, without the user noticing its absence until they decide, when located in another place, that they need to use the pair and find one is missing.

Some current approaches to addressing the issue of misplaced headphones use an app running on a smart device, usually the smart phone with which those headphones were paired, to allow the user to activate some sort of "search" function, sending a signal out to the missing headphones which in turn causes some sort of audible alert to sound at the headphones themselves, drawing the user's attention to their location. Success depends on the user being within range to hear the alert, of course, but also on whether the search is started when the headphones are within close enough range to receive the probing signal sent out from the smart device, although this may be at some considerable time after they were last used. In many real-life cases, the user may not realize the headphones are missing until they are well outside a reachable range. Also, given enough elapsed time, the battery in the headphones/earbuds may have run down enough that even if the headphone set is within a theoretical range, it can no longer respond.

There remains a need, therefore, to provide a method that can alert the user to the imminent possibility of losing headphones, by sounding some sort of audible alarm, as the distance between the headphones and the cell phone (to which those headphones are operationally coupled) increases to approach a value great enough that one could reasonably assume the user may be about to unintentionally leave the headphones behind. In cases where the headphones are distinctly separate earbuds, there is an additional need to provide a method where the audible alert is generated when the distance between the two earbuds increases to approach a value great enough that one could reasonably assume the user has left one of those earbuds behind unintentionally. Ideally, the methods would operate automatically in each case, with minimal input from the user beyond simply enabling the methods to run, as early as possibly in ownership or use of the headphones, well before any significant chance of losing track of them.

SUMMARY

Embodiments generally relate to methods and systems to prevent loss of headphones. In one embodiment, a method is disclosed that enables an alarm setting using an app on a cell phone wirelessly connected to the headphones; wherein the app responds by: continuously measuring a received magnitude of a wireless signal transmitted between the cell phone and the headphones; and if the measured received magnitude is lower than a predetermined threshold value for a first predetermined time, activating an audible alarm on the headphones. The continuous measurement and the activation of the alarm dependent on the measured received magnitude occur automatically, independent of any interaction with the app by a user after the alarm setting is enabled.

In another embodiment, a method that prevents loss of a first earbud of a pair of earbuds comprising the first earbud and a second earbud, comprises enabling an alarm setting using an app on the cell phone; wherein the app responds by: continuously measuring a received magnitude of a signal transmitted by the second earbud and wirelessly received at the first earbud; and if the measured received magnitude is lower than a predetermined threshold value for a first predetermined time, activating an audible alarm at the first earbud. The continuous measurement and the activation of the alarm dependent on the measured received magnitude occur automatically, independent of any interaction with the app by a user after the alarm setting is enabled.

In yet another embodiment, an apparatus is disclosed, comprising headphones comprising an alarm sensor and a speaker; and a cell phone running an alarm app including an alarm setting. The app is operable, when the alarm setting is enabled by a user, to: continuously measure a received magnitude of a wireless signal transmitted between the cell phone and the headphones; and if the measured received magnitude is lower than a predetermined threshold value for a first predetermined time, activate an audible alarm at the headphones. The continuous measurement and the activation of the alarm dependent on the measured received magnitude occur automatically, independent of any interaction with the app by a user after the alarm setting is enabled.

A further understanding of the nature and the advantages of particular embodiments disclosed herein may be realized by reference of the remaining portions of the specification and the attached drawings.

BRIEF DESCRIPTION OF THE DRAWINGS

FIG. 4 is a flowchart of a method for preventing loss of an earbud according to one embodiment.

DETAILED DESCRIPTION OF EMBODIMENTS

Embodiments described herein are directed to the use of an app on a smart device, typically a cell phone, although in some cases a tablet or some other similar device may be envisaged that would also benefit from the ideas described herein, to reduce the likelihood of loss of headphones wirelessly connected to that device.

Figure 1:
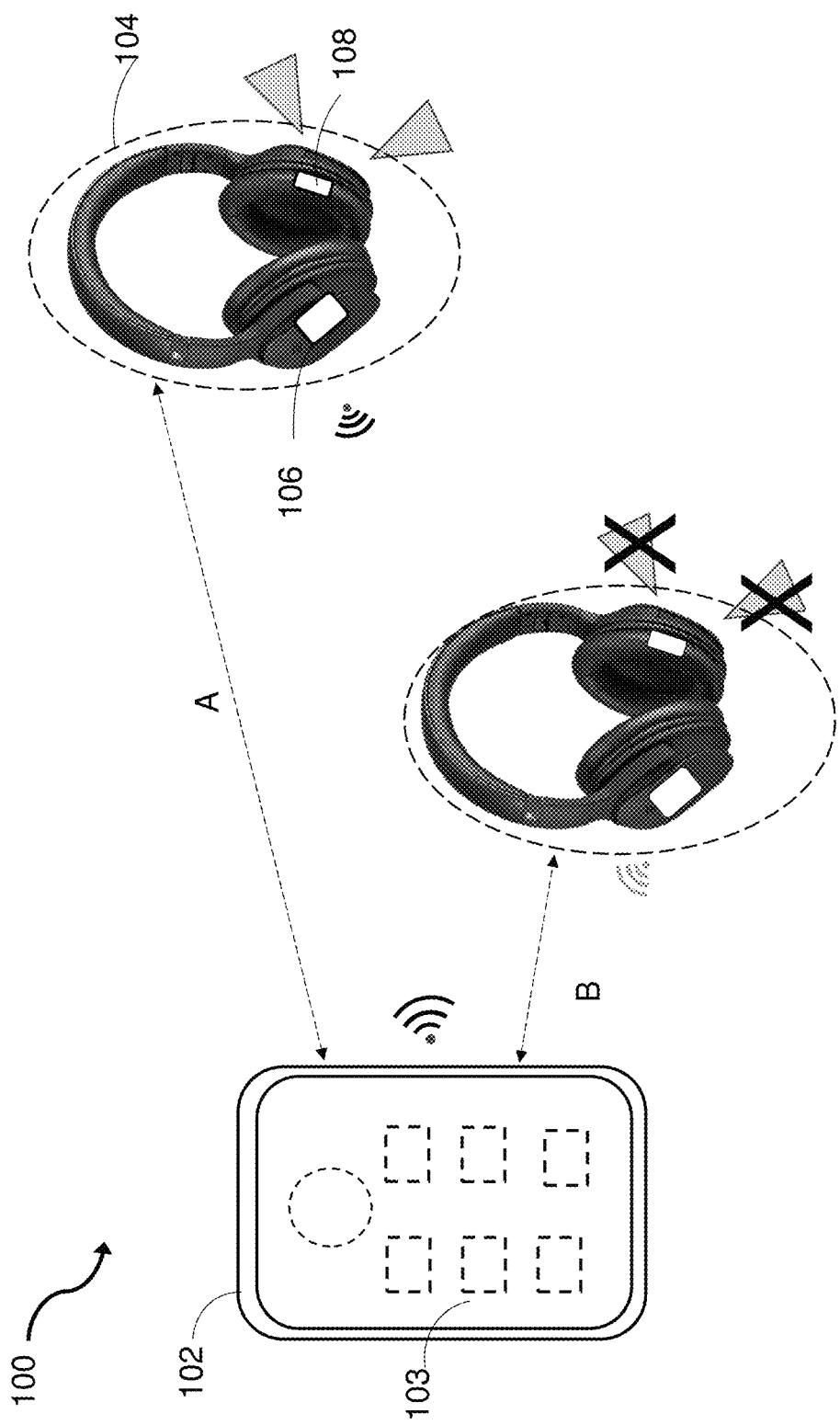
FIG. 1 illustrates a system that can prevent loss of headphones, according to one embodiment.

FIG. 1 schematically illustrates a system embodiment 100 comprising a headphone set 104 and software installed into smart device 102 wirelessly paired with and connected to the headphone set 104. In this case device 102 is shown as a smart phone (though it could be a tablet, laptop, or other computing device in the user's possession) that includes one or more processors 103 running suitable software. In many cases this software would be provided by the headphones' manufacturer in the form of a "headphone companion" app, with an option for a device alarm function. When an alarm setting is activated or enabled on the app, and when the headphones are powered on, paired with the cell phone running the app, and actively connected to it, the strength of the connecting signal between headphone set 104 and cell phone 102 is continuously monitored. In some cases, the signal may use Bluetooth or Bluetooth Low Energy (BLE) technology.

Now consider the illustrated situation where the distance "A" between headphones 104 and cell phone 102 is large enough (the drawing is obviously not to scale) to suggest that a user of the cell phone may be walking away from the headphones and be at risk of forgetting them. An indication of the distance may be provided by sensor 106 at the headphones, detecting the strength of a signal received after transmission from cell phone 102. A processor (typically at the cell phone, but optionally at the headphones instead or in addition) then compares that signal strength with a threshold signal level that has been previously determined to be a reasonable indication of a "safe" distance, and stored in the app. The threshold may in some cases be adjustable by the user.

In the illustrated "A" case, the signal strength detected at the headphones is lower than that threshold, and a speaker 108 at the headphones (normally the same speaker used for normal headphone operation, but labeled here for simplicity) is automatically activated to provide an audible alarm, alerting the user to their location. The alarm may contain a recorded message, asking whoever finds the headphones to call a particular phone number, or return them to a particular address. In some cases, a visual alert such as a blinking light may also be provided, drawing further attention to the headphones.

In some cases, an audible and/or visual alert user may also be provided to the user at the cell phone, indicating that the headphones are at risk of being lost.

In the illustrated "B" case, the signal strength detected at the headphones is larger than the threshold, and of course, no audible or visual alarm is produced.

To avoid frequent alarm activations that are not helpful—as a user is moving around a room, for example, moving away from the headphones for short periods but frequently returning to their proximity—a time delay feature is helpful. The idea is that in order for an alarm to be triggered, the "low signal" condition must persist for a period of time long enough for it to be likely that it will not be reversed unless the user is warned. This can be done by comparing the time for which the signal is low to some threshold time, set and optionally adjustable in the app.

The alarm may include spoken words—a literal message such as "Don't forget your headphones!" for example, or "Here are your headphones!"—or simple musical notes forming a chime or other pattern easily recognized by the user. In some cases, both words and music may be used. In some embodiments, not shown, a speaker on the cell phone may sound the same or a similar alarm as that on the headphones to alert the user, or an alert notification may simply be displayed on the cell phone screen. These latter options could be helpful at relatively small spatial separations between cell phone and headphones.

In some embodiments, the audible alarm will be silenced if the wireless signal rises above the predetermined threshold and remains there for some predetermined time. Another reason for silencing the audible alarm could be if the headphones themselves are switched off. This may be done by the user in certain situations, where the alarm in no longer thought to be necessary for example, or by some other person who discovers the headphones, is unable to easily restore them to the user, and finds the alert annoying.

Figure 2:
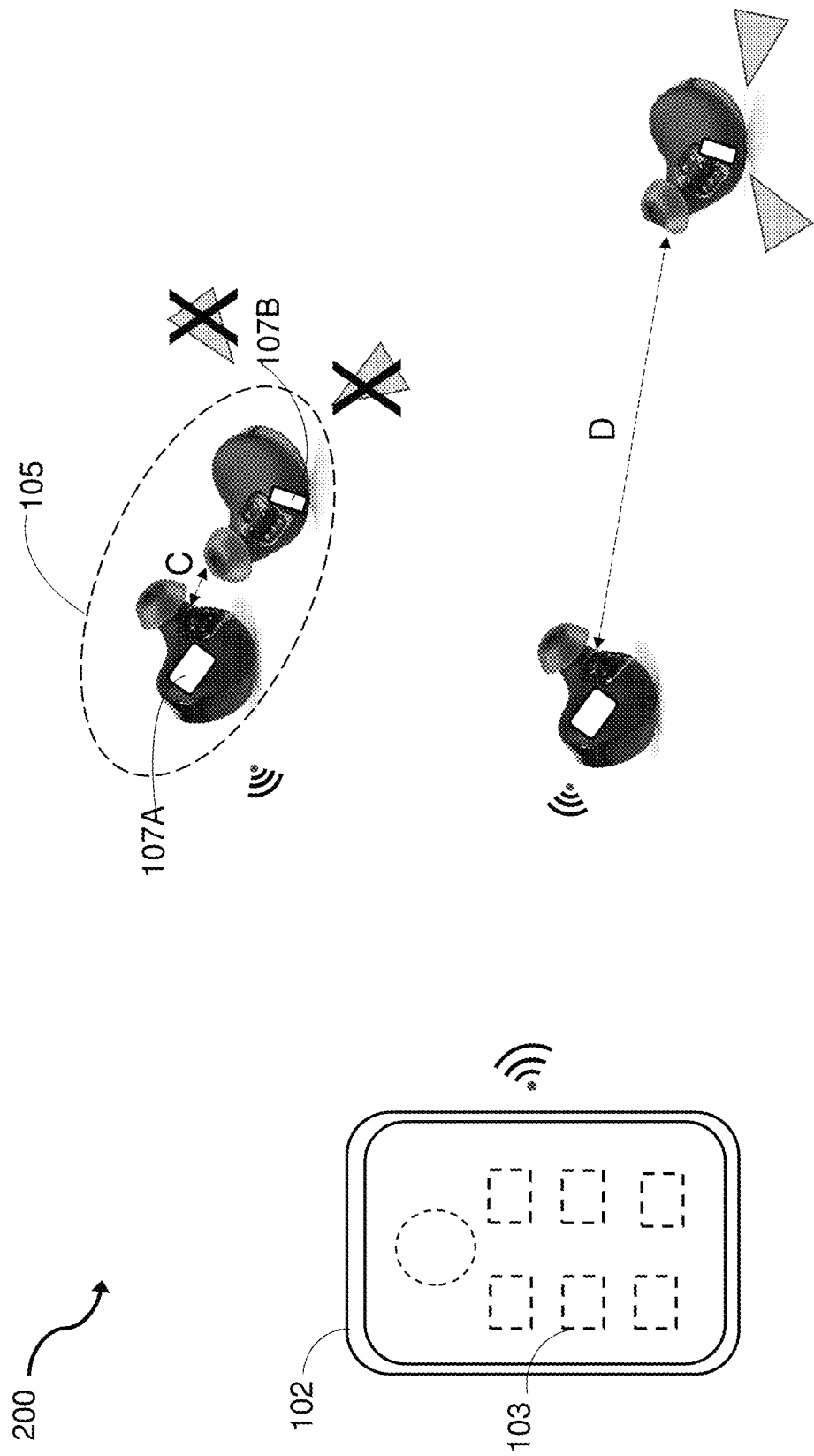
FIG. 2 illustrates a system that can prevent loss of an earbud according to one embodiment.

FIG. 2 schematically illustrates a system embodiment 200 comprising headphones in the form of a pair of physically separatable earbuds 105, such as the increasingly popular true wireless stereo (TWS) earbuds, and software operable as described below, typically in the form of a headphone companion app, installed in a smart device 102 wirelessly paired with and connected to the earbuds. While the loss prevention scenario described above with respect to FIG. 1 may still be applicable, there is clearly an additional complication, in that if only one of the earbuds has a signal-strength-detecting sensor, indicating distance to the cell phone, it is possible that even if that one earbud is locatable, the two earbuds may have got spatially separated, and the other one of the pair may not be found so easily. Some embodiments of the present invention address this problem as will now be described.

Assume for simplicity that one earbud of the pair in wireless contact with cell phone 102 as the "master" earbud has a transmitter 107A that capable of sending a wireless signal to the other earbud of the pair, the "slave" earbud, whenever the pair are powered on, paired to the cell phone and operationally connected thereto, and that the slave earbud has a sensor 107B capable of detecting that signal, though other arrangements may be envisaged. When an alarm setting is activated or enabled on the app on cell phone 102, transmitter 107A sends a corresponding wireless signal transmission to the slave earbud, and the strength of that signal is continuously monitored. In some cases, the signal may use Bluetooth or Bluetooth Low Energy (BLE) technology.

In the illustrated "C" case, the two earbuds in the pair are close together, and a processor in the master earbud or in the cell phone, comparing the detected signal strength with a predetermined threshold value, should show that the signal is high enough for safety, and no further action is needed. In the illustrated "D" case, where the two earbuds are much further apart, the signal strength falls below the threshold value, indicating the possibility of the earbuds being so far apart that the user should be alerted to the possibility of loss. This is done by sounding an alarm, making use of a speaker built into the "slave" earbud (as shown in the Figure), and/or a speaker built into the "master" earbud. The user may also be alerted by a visual or audible indication at the cell phone, to indicate that a search is underway.

The various options regarding setting and adjusting thresholds, combining signal strength and temporal persistence of below-threshold, different alarm content etc. are essentially the same as those discussed above with regard to the FIG. 1 embodiments.

Figure 3:
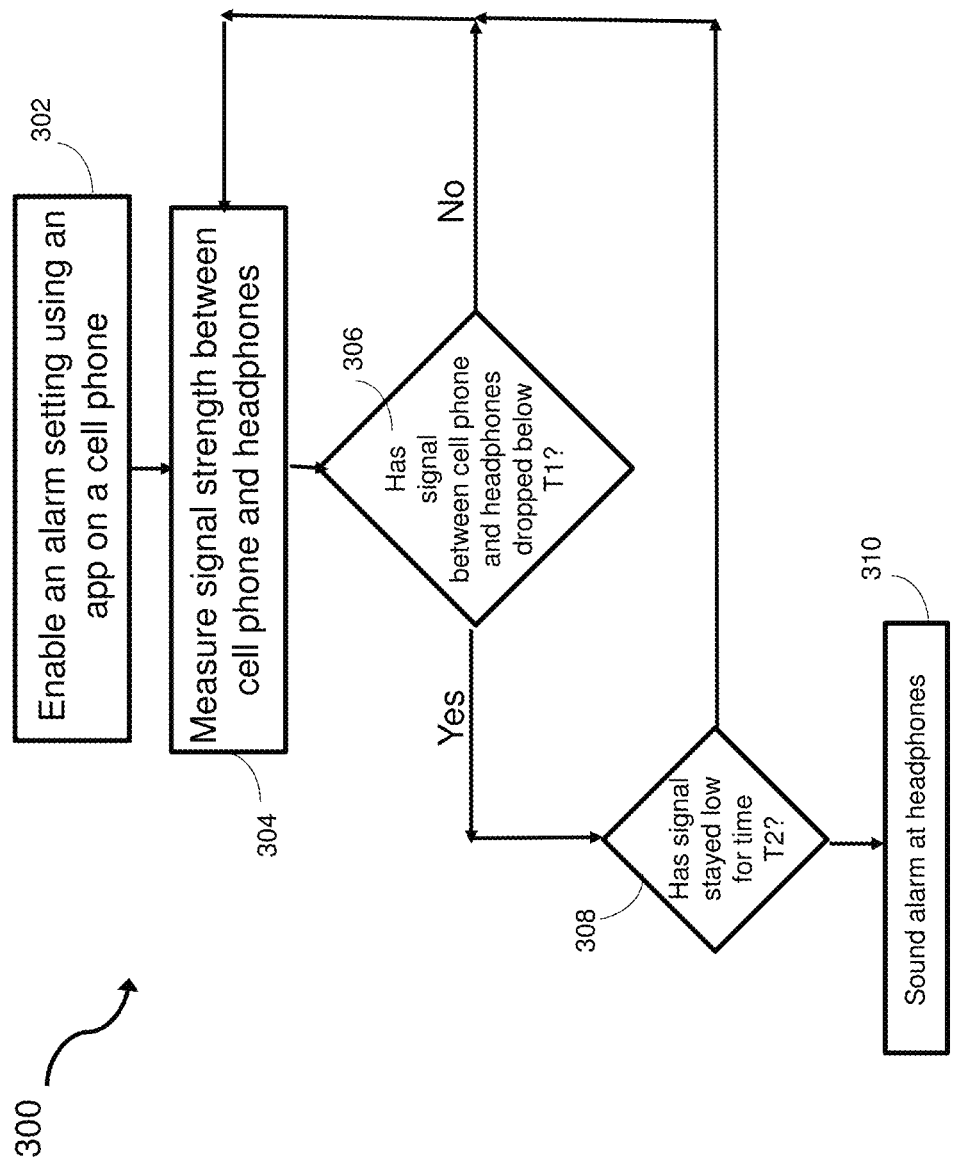
FIG. 3 is a flowchart of a method for preventing loss of headphones according to one embodiment.

The manner in which system 100 operates to carry out the present invention may best be understood with reference to the flowchart of method 300, shown in FIG. 3, where it is assumed that a "headphone companion" app, specific to the particular make and model of the headphone set, has been installed on a smart device, such as cell phone 102. At step 302, an alarm setting in the app is enabled by the user. Step 304 is carried out in response to that setting enablement, monitoring the strength of a signal transmitted between the cell phone and the headphones.

A comparison is made at step 306 of that signal strength relative to a predetermined threshold level. In the normal case, where the headphones are reasonably close to the cell phone, the method flow continues back to step 304 and then back to step 306. If and when the signal strength falls below that threshold level, a timer is started, so that at step 308 it can be determined whether the low signal level has persisted for longer than a predetermined threshold time. If that condition is not met, the method flow continues back to step 304 and then back to step 306. If and when the persistence condition is met, step 310 is reached, and an audible alarm is activated at the headphones, alerting the user to the corresponding location.

FIG. 4 is a flowchart showing steps of a method 400 according to the present invention, for reducing the likelihood of loss of one earbud of a physically separatable earbud pair, as discussed above with reference to FIG. 2. Following a similar sequence to that of method 300, method 400 begins with enabling an alarm setting on a cell phone app, in this case at step 402. At step 404, the strength of a signal wirelessly transmitted between the earbuds is measured, and at step 406 it is determined whether the signal falls below a predetermined threshold value. In the normal case, where the earbuds are reasonably close to each other, the method flow continues back to step 404 and then back to step 406. If and when the signal strength falls below that threshold level, a timer is started, so that at step 408 it can be determined whether the low signal level has persisted for longer than a predetermined threshold time. If that condition is not met, the method flow continues back to step 404 and then back to step 406. If and when the persistence condition is met, step 410 is reached, and an audible alarm is activated at one (usually the "slave" earbud of a master-slave pair) or both of the earbuds to alert the user (or another person in close proximity to the earbud or earbuds) to the corresponding location.

A typical value of the predetermined time is 10 seconds, but in some embodiments this parameter could be adjustable, set by the user according to their situation.

In some instances, there may be more than one set of headphones in the vicinity of the user, but only the headphone set currently actively connected (powered, paired and connected) to the device running the alert app would be covered by the methods of the present invention.

Embodiments described herein provide various benefits to users of smart devices such as cell phones set up to be used with wirelessly connected headphones. In particular, some embodiments provide convenient means to prevent loss of headphones in situations such as the user forgetting to pick them up and keep them close when moving from one location to another. The user simply makes use of an app on the cell phone to enable an alarm setting for the headphones. The user can then be assured that as long as the headphones are powered on, paired and connected to the cell phone, if the cell phone or the headphones are subsequently moved to a separation large enough to suggest that the headphones are in danger of getting lost, an audible warning alarm will be sounded at the headphones, alerting the user to their current location. Other embodiments provide a similar assurance in the case where the headphones are made up of separate earbuds, alerting the user to the location of one earbud, present at a suspicious distance from the other.

Some embodiments facilitate adjustment of settings in the app for the individual user, tailoring operation to situations of most relevance to that user.

Although the description has been described with respect to particular embodiments thereof, these particular embodiments are merely illustrative, and not restrictive.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A computer may be any processor in communication with a memory. The memory may be any suitable processor-readable storage medium, such as random-access memory (RAM), read-only memory (ROM), magnetic or optical disk, or other non-transitory media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method of preventing loss of headphones; the method comprising:
enabling an alarm setting using an app on a cell phone in wireless communication with the headphones;
wherein the app responds by:
continuously measuring a received magnitude of a wireless signal transmitted between the cell phone and the headphones; and
if the measured received magnitude is lower than a predetermined threshold value for a first predetermined time,
activating an audible alarm at the headphones;
wherein the continuous measurement and the activation of the alarm dependent on the measured received magnitude occur automatically, independent of any interaction with the app by a user after the alarm setting is enabled.

2. The method of claim 1, wherein the audible alarm includes spoken words.

3. The method of claim 1, wherein the audible alarm includes musical notes.

4. The method of claim 1, wherein a second audible alarm sounds on the cell phone.

5. The method of claim 1, wherein the wireless signal is a Bluetooth or BLE signal.

6. The method of claim 1, wherein, after activating the audible alarm at the headphones, the app silences the audible alarm if the measured received magnitude rises above the predetermined threshold and remains above the predetermined threshold for longer than a second predetermined time.

7. The method of claim 1, wherein, after activating the audible alarm at the headphones, the app silences the audible alarm if the headphones are switched off.

8. The method of claim 1, wherein the first predetermined time is adjustable by the user.

9. The method of claim 1, wherein simultaneously with or after activating the audible alarm at the headphones, the app activates a visual alert on the headphones.

10. The method of claim 1, wherein simultaneously with or after activating the audible alarm at the headphones, the app activates at least one of an audible alarm at the cell phone and a visual alert at the cell phone.

11. A method of preventing loss of a first earbud of a pair of earbuds comprising the first earbud and a second earbud, the method comprising:
enabling an alarm setting using an app on a cell phone in wireless communication with the pair of earbuds;
wherein the app responds by:
continuously measuring a received magnitude of a signal transmitted by the second earbud and wirelessly received at the first earbud; and
if the measured received magnitude is lower than a predetermined threshold value for a first predetermined time, activating an audible alarm at the first earbud;
wherein the continuous measurement and the activation of the alarm dependent on the measured received magnitude occur automatically, independent of any interaction with the app by a user after the alarm setting is enabled.

12. The method of claim 11, wherein the audible alarm includes spoken words.

13. The method of claim 11, wherein a second audible alarm sounds at the cell phone.

14. The method of claim 11, wherein the wireless signal is a Bluetooth or BLE signal.

15. The method of claim 11, wherein, after activating the audible alarm at the first earbud, the app silences the audible alarm if the measured received magnitude rises above the predetermined threshold and remains above the predetermined threshold for longer than a second predetermined time.

16. The method of claim 11, wherein, after activating the audible alarm at the first earbud, the app silences the audible alarm if the pair of earbuds is switched off.

17. An apparatus comprising:
headphones comprising an alarm sensor and a speaker; and
an alarm app including an alarm setting, the alarm app operable, when installed in a cell phone wirelessly connected to the headphones and when the alarm setting is enabled by a user, to:
continuously measure a received magnitude of a wireless signal transmitted between the cell phone and the headphones; and
if the measured received magnitude is lower than a predetermined threshold value for a first predetermined time, activate an audible alarm at the headphones;
wherein the continuous measurement and the activation of the alarm dependent on the measured received magnitude occur automatically, independent of any interaction with the app by a user after the alarm setting is enabled.

18. The apparatus of claim 17, wherein the headphones further comprise a visual indicator, activatable by the alarm app if and when the audible alarm at the headphones are activated.

19. The apparatus of claim 17, wherein the wireless signal is a Bluetooth or BLE signal.

20. The apparatus of claim 17, wherein the audible alarm includes spoken words.

* * * * *